United States Patent
Clostermeyer

[19]

[11] Patent Number: 6,050,074
[45] Date of Patent: Apr. 18, 2000

[54] BALER TO PRODUCE PRESSED BALES OF HARVESTED CROPS

[75] Inventor: Gerhard Clostermeyer, Gütersloh, Germany

[73] Assignee: Claas KGaA, Harsewinkel, Germany

[21] Appl. No.: 09/059,165

[22] Filed: Apr. 13, 1998

[30] Foreign Application Priority Data

Apr. 12, 1997 [DE] Germany .................... 197 15 280

[51] Int. Cl.[7] .................................................. A01F 15/00
[52] U.S. Cl. ............................................. 56/341; 100/88
[58] Field of Search .................. 56/131, 341; 100/88, 100/100, 189, 218, 255; 914/111

[56] References Cited

FOREIGN PATENT DOCUMENTS

| 2759533B1 | 3/1980 | Germany | A01F 15/10 |
| 3638792C2 | 5/1988 | Germany | A01F 15/04 |
| 4111985A1 | 10/1992 | Germany | A01F 15/10 |
| 19531240A1 | 2/1997 | Germany | A01F 15/10 |

*Primary Examiner*—Robert E. Pezzuto
*Attorney, Agent, or Firm*—Husch & Eppenberger, LLC; Robert E. Muir

[57] ABSTRACT

The present invention describes a self-propelled or pulled baler for producing bales of agriculturally-harvested crops. Harvested crops are compressed in the feeding channel before entering the actual baling chamber. For this purpose a sensor reaches into the feeding channel. Crops will be pushed against the sensor by the feed rakes. As soon as a pre-adjusted pressure can be measured at the sensor, and the baling ram has moved towards the front dead center position, the motion track of the feed rakes will be switched so the compressed crops located in the feeding channel will be fed into the baling chamber through a single loading stroke. The change of the motion track of the feed rakes dependent upon the pressure sensor has the advantage that, with each loading stroke, an equal amount of compressed crops are fed into the actual baling chamber. Thus, bales of a consistent density can be produced.

21 Claims, 2 Drawing Sheets

BALER TO PRODUCE PRESSED BALES OF HARVESTED CROPS

BACKGROUND OF THE INVENTION

The present invention relates generally to agricultural machinery and, more particularly, to improvements to balers for harvested crops.

A self-driven or pulled baler for producing pressed bales of harvested crops has a crank-driven reciprocating baling ram, located in the pressing channel, a crop feeding channel leading into the pressing channel, and a crop rake consisting of a rake lever and a plurality of rakes in the pressing channel. The crop rake is driven by a crank drive. The motion track of the feed rakes can be changed for crop feeding or loading strokes. The rake levers are pivotally mounted at one end on crank pins and their opposite ends are connected with an end of the joint rod. The joint rod's other end is mounted on a movable bearing. The self-driven or pulled baler also has a pick-up device for baled crops, as well as a drive and control devices for the operation of the baling ram.

A baler of the aforementioned type is shown and described in German Patent No. 36 38 792. In this baler, the crank drive for the piston ram is forcibly connected with the crank drive of the feed rakes. After two feed strokes, which transfer the harvested crops into the feeding channel, the feed rakes perform a single loading stroke, transferring the harvested crops from the feeding channel into the baling channel. This motion of the feed rakes is cyclically repeated, so that even if a very small amount of crops is in the feeding channel, every third rake stroke becomes indispensably a loading stroke. As a result, with each loading stroke, different amounts of pre-compressed crops are fed into the actual bale chamber. The resulting disadvantage can be seen in the final product, especially in cases of fluctuating amounts of picked-up crops, which results in non-uniform, irregularly compressed or formed bales.

To avoid irregularly formed bales it is known from German Patent Publication No. 27 59 533 to install a feeding drum, more specifically a rotational feeder, in the balers' feeding channel. The feeding drum is equipped with controlled fingers which feed the crops against a pressure sensor in the feeding channel. In addition to the feeding drum, feed rakes are installed to aid in the uniform shaping and forming of the bales. Once the pre-set pressure in the pressure sensor is reached, the feed rakes enter through slits in the feeding channel and feed the pre-compressed crops into the actual baling chamber. The arrangement of the feeding drum operating with controlled fingers and the additional feed rakes, which are necessary for the loading stroke, has very high construction costs. Also, in severe circumstances, the feeding drum is incapable of completely filling the feeding channel.

In addition, German Patent Publication No. 195 31 240 shows a class-type piston ram with a rotational feeder whose feeding mechanisms are movable along a feeding curve. According to the description, the invention feeds uniformly dense amounts of crop portions into the pressing channel. The uniformity of the feeding portions should be accomplished by manipulating the feeding mechanism's curve track, resulting in a variation of volume and density of the partial amounts of subset portions. However, this solution is unsuitable to create uniformly dense feeding portions for small crop amounts, because if a required minimum volume is underfed, the fill volume of a feeding portion will not completely fill the pressing channel. Additionally, the rotational feeders have much higher manufacturing costs and also have the disadvantage that the rollers of the gate shift guide for the controlled fingers are subject to high wear.

It is desirable to provide a baler that overcomes one or more of the deficiencies noted above.

An objective of the present invention is to provide a baler having lever arm-controlled feed rakes as the exclusive feeding mechanism, where uniformly pre-pressing the harvested crops and forming uniformly sized and shaped bales can be accomplished, even with small amounts of harvested crops, without the assistance of additional feeding devices in the feeding channel.

SUMMARY OF THE INVENTION

The objectives of the present invention are achieved by changing the position of the joint rod bearings, which are located distantly from the feed rakes, through a direct or indirect control signal received from at least one sensor located in the feeding channel and triggered by the crops in the feeding channel. This control signal can be transferred by electric, electronic, mechanical, hydraulic or similarly working, equally acting, sensors or actuators. The crops in the feeding channel can directly trigger the sensor, or indirectly trigger the sensor by levers, switches, light or other transfer means. When the sensor is triggered indirectly, it can also be located outside the feeding channel. In contrast to the apparatus disclosed in German Patent No. 36 38 792, loading strokes will only be performed when crops in the feeding channel are available in sufficiently large quantities and are sufficiently pre-compressed. Depending on the control signal, the feed rakes can pass through different curve tracks, at least one of which, triggered by the control signal, makes a partial loading of crops into the baling chamber possible. On the one hand, complete uniformity of form and density of the loading portions cannot be accomplished with this arrangement. However, by omitting one or several loading strokes, it is certain that even when there are small amounts of crops to be pressed, sufficient amounts of crops to be compressed are always fed into the baling chamber. Thus, the crops to be baled can be pre-compressed and the baling chamber will be filled to its full capacity. These effects are very important pre-conditions for uniformly formed bales.

In accordance with the present invention there is provided a baler for producing pressed bales of harvested crops and having a crank-driven moving baling ram located in a pressing channel; a crop feeding device for feeding the harvested crops into the pressing channel and a crop rake, which is also movable by a crank drive; a rake lever and a plurality of rakes in the pressing channel, whereby the motion track of the feed rakes can be changed for crop feeding or loading strokes, the rake levers being pivotally mounted on crank pins, the opposite ends of the rake tips being connected with an end of the joint rod whose other end is mounted on a movable bearing; a pick-up device for the baled crop, and a drive and control device for operation of the baling ram; a sensor located in the feeding channel for triggering, either directly or indirectly, a change of position of the bearings of the joint rods.

Additional advantageous embodiments of the invention are apparent from the detailed description.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
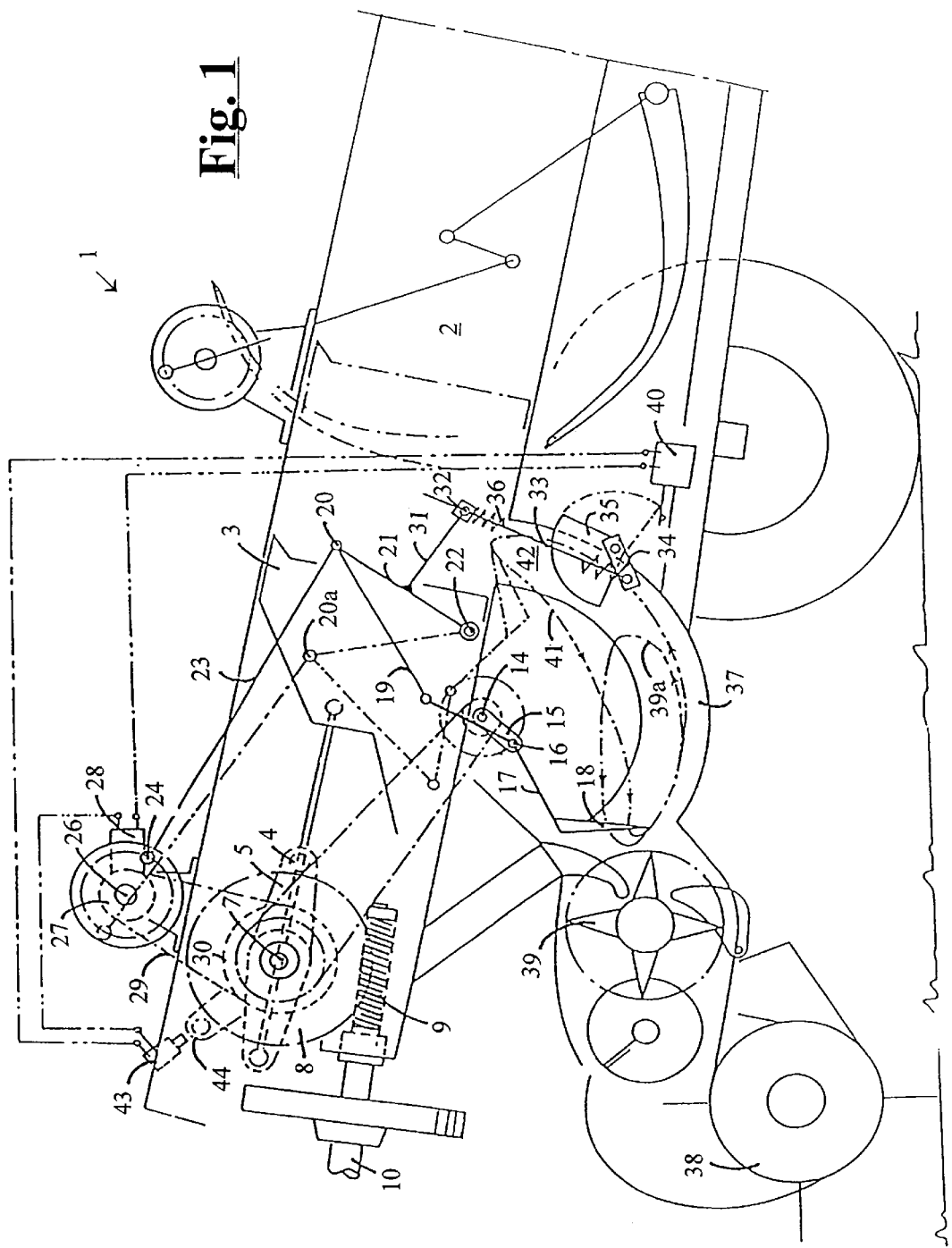
FIG. 1 is a diagrammatic side view of a baler with a control device located above the baling chamber.

FIG. 1 shows a baler, generally designated 1, having a pressing channel 2 and a reciprocating baling ram 3. The baling ram 3 is connected with the crank-pin 4 via a connecting rod mounted on a crank arm 5. The crank arm 5 is connected torsionally to a shaft 7. This shaft 7 is driven by a worm gear wheel 8 and a worm screw 9. The worm screw 9 is coupled, in a way well known in the art, via shaft 10 to the P.T.0. shaft of a tractor pulled baler 1. A similar drive assembly can be found in a self-propelled baler. The shaft 7, the rake crank shaft 14, and the crank-arm 15 are in a constant transmission ratio. Crank pins 16 are installed on the idle arms of crank-arms 15, where rake levers 17 are pivotally mounted. The ends of the rake levers 17 opposite to the feed rakes 18 are connected via a joint rod 19, whose bearing position is changeable. For this purpose, the bearings 20 are hinged on levers 21, which are pivotal around a fixed reference point 22. At least one of the bearings 20 is connected with a pin 24 via a connecting rod 23, whose crank-arm is mounted on a shaft 26. A sprocket 27 is placed on the shaft 26, which, if needed, can be connected via a one-stop clutch 28 to the shaft 26. A chain 29 surrounds the sprocket 27 and the fixed mounted sprocket 30, which is located on the baling ram's 3 crank shaft.

An arm 31 is mounted on a lever 21, whose idle end supports a guide body 32. The guide bodies 32 have an orifice, through which a free-moving rod 33 is placed. The free-moving rod 33 is hinged on a shift lever 34 connected torsionally to a pressure switch 35 which acts as a sensor. The free-moving rod 33 is surrounded by a spring 36, which is supported on one end by guide bodies 32 and on the other end by the shift lever 34. The shift lever 34 and the pressure switch 35 are held in place as shown by the straight lines in FIG. 1, where the pressure switch 35 reaches partially into the crop feeding channel 37. The shift lever 34 could also be mounted on a movable wall of the feeding channel 37. Instead of engagement via shift lever 34, filling of the feeding channel 37 could also be accomplished by measuring the mechanical pressure of the feeding channel's 37 walls, by measuring frame components or working components such as the rakes through wire resistance strain gauges, by transferring movements of measuring fingers onto potentiometers via optical sensors, which monitor the fill level of feeding channel 37, or other similarly working devices. The listing of these measuring means and sensors should be understood only as examples. Experts should have no problems using these or other sensory or measuring devices.

By coordinating individual elements with one another, critical fill levels in the feeding channel 37 can be avoided. A critical fill level can occur when the shift lever 34 does not trigger the cam track for the load stroke, due to low fill levels in the feeding channel 37. However, during the next working cycle of the baling ram 3, the feed rake 18 will continue to feed crops to be compressed into the feeding channel 37, causing the feed channel to be overloaded. The resultant jams or clogs in the feeding channel 37 trigger the overload clutch. Otherwise crop compressing loss occurs because crops to be pressed fall out of the baler. To prevent such overloads, it is important to coordinate the path of the motion track 41, the position of the pressure switch 35 in the feeding channel 37, the force of the spring 36, and the pivot path of the shift lever 34 to the shift point and its pivot angle. A rough starting point for the decision whether the crop portion should be fed into the baling chamber 3 could be that if the feeding channel is filled in excess of two-thirds of the feeding channel's 37 capacity, the harvested crops should be fed into the baling chamber 3. This amount can change depending on the kind of crops to be handled, because the crop characteristics of straw, hay or silage are different. It would be advantageous to have a feeding control system that is sensitive to the type of crops being baled, where the baler operator may pre-select the type of crops to be baled, and the baler's 1 control system automatically selects the appropriate shift points.

While the baler 1 is in operation, the swath which is dropped on the field by, for example, a combine harvester, will be picked up by a tine drum 38, and if required, will be fed into the feeding channel 37 by inter-connected concurrent rotors 39, equipped with cutting blades. The feed rakes 18 move the crops towards the pressure switch 35, following the motion path shown by phantom line 39a. As soon as a sufficiently large quantity of crops has built-up in front of the pressure switch 35, creating corresponding high pressure, it will be pivoted clockwise against the resilience of the spring 36, triggering the switch 40. The switch 40 can only then act upon a clutch 28.

If the switch 43 is also triggered, the movements of the feed rakes 18 with the baling ram 3 will be synchronized.

The switch 43 prevents the feed rakes from performing a load stroke if the baling ram's 3 underside covers the feeder opening 42. The switch 43 is triggered by the gear shift gate 44 mounted on the crank-arm 5 when the baling ram 3 moves towards its front dead center position and frees the feeder opening 42 near the baling ram 3. Synchronization of the control device with the movement of the baling ram 3 can also be monitored by various switches or sensors directly assigned to the baling ram 3, such as mechanical measuring fingers, electrical or optical sensors, or other means for transferring electrical control signals. Engaging the switch 43 to act upon the clutch 28 causes, for the time of at least one feed rake stroke, the sprocket 27 to become firmly connected with the drive of crank shaft 26, so that the bearings 20 are pivoted through the connecting rod 23 around its fixed reference point 22 into position 20a. This also causes the arm 31 to swing upwards, releasing the tension of the spring 36. The pressure switch 35 may be swiveled easily out of the feeding channel 37 by the harvested crops, so that the pressure switch 35 does not resist the crop feeding process in any major way. The change in the position of the bearings 20 changes the motion track of the feed rakes 18. As a result, for at least one feed rake stroke, the feed rakes go through the motion track for a load stroke shown by phantom line 41. Also, the pre-compressed crops in the feeding channel 37 are fed through opening 42 into the baler's 1 baling chamber 2 and the baling ram 3 takes the position as shown by the straight lines, releasing opening 42. After completion of the load stroke, the bearings 20 will be moved back into their original position and the segment 35 will simultaneously be swiveled back into the feeding channel 37. In this starting position, the feed rakes 18 again pass through the track marked as 39a. It should also be mentioned that the drives from shaft 7 to shaft 14 and to shaft 26 show a gear ratio of I=1:3 or I=1:2. In the case of I=1:2, one pre-bale or feeding stroke precedes the loading stroke. In the case of I=1:3 one pre-bale or feeding stroke precedes at least two loading strokes.

In addition to swiveling the bearings 20 by the control devices marked with the reference numbers 24 through 30, it is also possible to accomplish the swiveling by electric or hydraulic motor, not shown in more detail, which is synchronized in a similar way with the baling ram 3.

Figure 2:
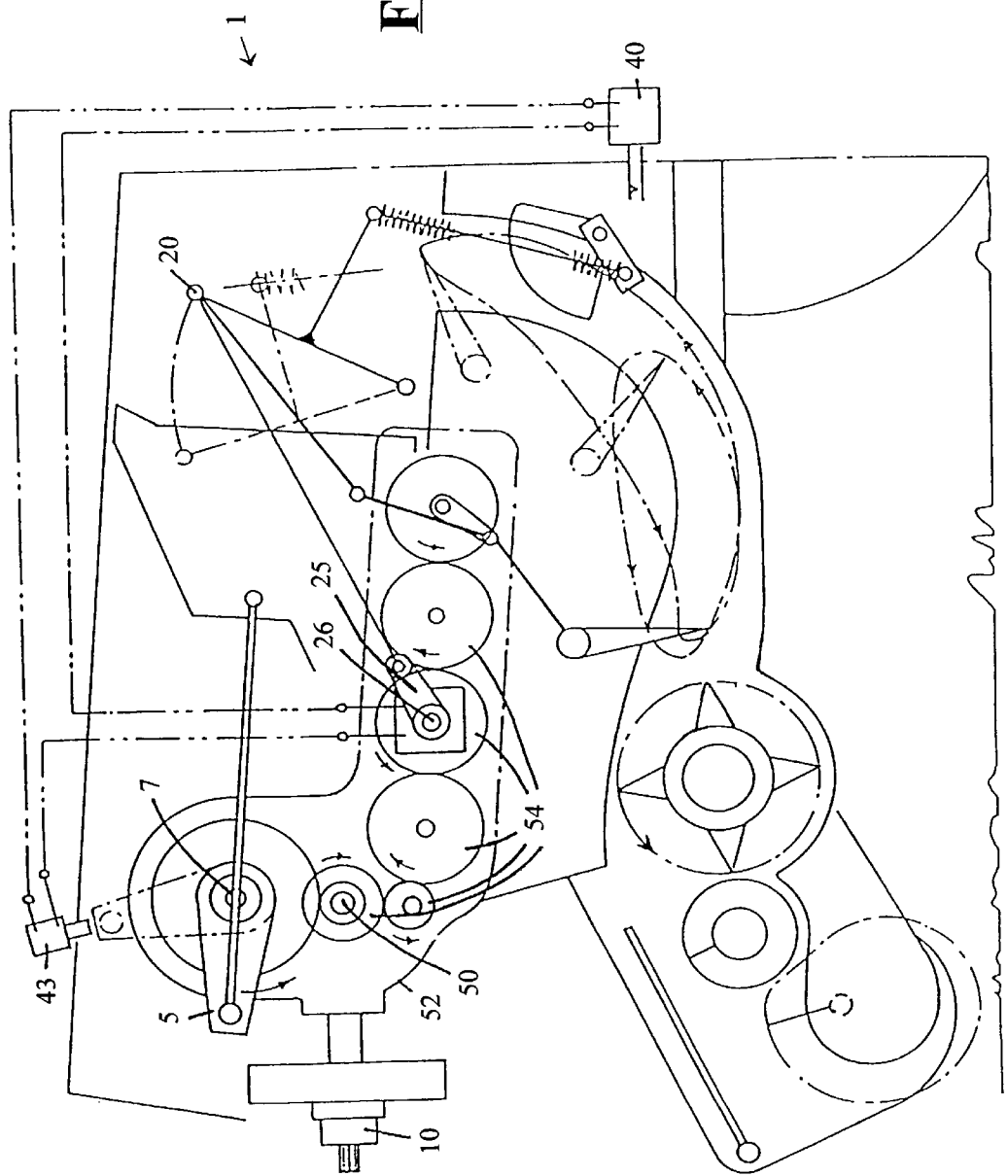
FIG. 2 is a diagrammatic side view of a baler with a control device located below the baling chamber.

Baler 1 is shown in FIG. 2 with a different construction of the transmission path. The shaft 26 is not driven by the shaft 7 of crank arms 5, rather the drive mechanism as shown in the practical example in FIG. 2 is powered by a central drive shaft 50 in the main transmission 52 via drive-connected spur gears 54. The advantage of this arrangement over chain drives is less maintenance and less wear and tear of the spur gear-steps. In addition, the total overall height of the baler 1, built according to this practical example, is lower and the construction expenditure is lower because the drive for the control device can be provided by lengthening a bearing shaft for a spur gear 54. Only the crank 25 and the one-stop clutch 28 has to be slipped on the bearing shaft 26. The explanations in FIG. 1 are equally applicable for the practical example shown in FIG. 2.

Other objects, features and advantages will be apparent to those skilled in the art. While preferred embodiments of the present invention have been illustrated and described, this has been by way of illustration and the inventions should not be limited except as required by the scope of the appended claims.

What is claimed is:

1. In a baler for producing pressed bales of harvested crops and having a crank-driven moving baling ram located in a pressing channel, a crop feeding device for feeding the harvested crops from a feeding channel into the pressing channel and a crop rake, which is movable by a crank drive, comprised of a plurality of rake levers and a plurality of feed rakes in the feeding channel and moveable through a motion track, means for changing the motion track of the feed rakes for crop feeding or loading strokes, the rake levers having rake tips and being pivotally mounted on crank pins, the ends of the rake levers opposite the rake tips being connected with an end of a joint rod whose other end is mounted on a movable bearing, a pick-up device for the baled crop and a drive and control device for operation of the baling ram; the improvement comprising:

a sensor located in the feeding channel for sensing crops in the feeding channel, and means responsive to the sensor for triggering a change of position of the bearing of the joint rod to thereby change the motion track of the feed rakes.

2. A baler according to claim 1, including a lever operatively connected to the bearings, and means for pivotally mounting said bearings and lever for pivotal movement around a fixed reference point.

3. A baler according to claim 2, including a crank pin, and at least one connecting rod connected with the lever and movable in a reciprocating way via the crank pin.

4. A baler according to claim 3, including a baler drive having a first shaft, a clutch, means coupling the clutch with the first shaft of the baler drive; and wherein the crank pin is operatively mounted on the shaft.

5. A baler in accordance with claim 4, further including a second shaft, and means providing a driving connection between the first and second shafts and having a driving ratio of 1:3.

6. A baler according to claim 4, wherein the sensor is in the form of a pressure switch, and wherein said clutch is engageable in response to movement of the pressure switch in the feeding channel and in response to movement of the baling ram towards a front dead-center position.

7. A baler according to claim 6, including means for holding said pressure switch in a home position in the feeding channel.

8. A baler according to claim 7, wherein said holding means includes a spring arranged for acting upon said pressure switch, and wherein the spring has a force which may be adjusted, depending on the crop material to be baled.

9. A baler according to claim 8, wherein said pressure switch, after overcoming the force of the spring which keeps it in its home position, will be swiveled against a limit stop by the crop fed through the feeding channel by the feed rakes, and engages a first switch which, together with a second switch, triggers a one-stop clutch.

10. A baler according to claim 9, including a gear shift gate, and wherein said second switch is engageable by the gear shift gate when the baling ram moves towards the front dead-center position.

11. A baler in accordance with claim 4, further including a second shaft, and means providing a driving connection between the first and second shafts and having a driving ratio of 1:2.

12. A baler according to claim 6, including power means for actuating the clutch and baling ram, depending on the position of the pressure switch.

13. A baler according to claim 8, including a shift lever which is connected torsionally to the pressure switch and a rod hinged to the shift lever; and wherein the spring is circumjacent the rod.

14. A baler according to claim 13, including a free-moving guide body at a distal end of the rod, an arm for supporting the guide body, said arm being pivotally around the fixed reference point; and wherein said rod extends through said guide body.

15. A baler according to claim 8, including means for minimizing the force of the spring, acting upon the pressure switch, during the loading stroke.

16. A baler according to claim 1, including a first switch associated with the sensor for selective engagement to ensure maximum throughput during the baling of consistently dense swathes of harvested crops.

17. A baler according to claim 1, including a plurality of actuators for effecting the motion tracks of the feed rakes.

18. A baler in accordance with claim 6, wherein at least one of the feed rakes starts the loading stroke after at least one crop feeding stroke of the feed rakes.

19. A baler in accordance with claim 18, including means for causing the loading stroke to cease and the feeding stroke to resume.

20. A baler in accordance with claim 18, including means for causing one feeding stroke preceding one loading stroke.

21. A baler in accordance with claim 18, including means for causing one pre-bale stroke preceding at least two loading strokes.

* * * * *